United States Patent
Chung et al.

(10) Patent No.: US 10,434,881 B2
(45) Date of Patent: Oct. 8, 2019

(54) BATTERY PACK OF NOVEL AIR COOLING STRUCTURE

(71) Applicant: LG CHEM, LTD., Seoul (KR)

(72) Inventors: Chae Ho Chung, Daejeon (KR); JiYoung Choi, Yongin-si (KR); JaeHun Yang, Daejeon (KR); SangYoon Jeong, Daejeon (KR); WonChan Park, Daejeon (KR); YongSeok Choi, Daejeon (KR); YoungHo Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 1034 days.

(21) Appl. No.: 14/080,288

(22) Filed: Nov. 14, 2013

(65) Prior Publication Data

US 2014/0072856 A1    Mar. 13, 2014

Related U.S. Application Data

(63) Continuation of application No. PCT/KR2012/004413, filed on Jun. 5, 2012.

(30) Foreign Application Priority Data

Jun. 21, 2011    (KR) .................. 10-2011-0059892

(51) Int. Cl.
*H01M 10/60* (2014.01)
*B60L 3/00* (2019.01)
(Continued)

(52) U.S. Cl.
CPC ............. *B60L 3/0046* (2013.01); *B60L 1/003* (2013.01); *B60L 1/02* (2013.01); *B60L 50/64* (2019.02);
(Continued)

(58) Field of Classification Search
CPC .... H01M 4/386; H01M 4/133; H01M 10/613; H01M 10/6566; H01M 10/6557;
(Continued)

(56) References Cited

U.S. PATENT DOCUMENTS 5,937,664 A * 8/1999 Matsuno ............ B60H 1/00278
62/186
2006/0093901 A1    5/2006 Lee et al.
(Continued)

FOREIGN PATENT DOCUMENTS

EP    1 750 322 A2    2/2007
JP    2004-047363 A    2/2004
(Continued)

OTHER PUBLICATIONS

Translation of JP 2008-254627.*
(Continued)

*Primary Examiner* — Ula C Ruddock
*Assistant Examiner* — Matthew W Van Oudenaren
(74) *Attorney, Agent, or Firm* — Birch, Stewart, Kolasch & Birch, LLP

(57) ABSTRACT

Disclosed is a battery pack having a structure in which a plurality of unit cells constitutes a battery module, two or more of the battery modules are vertically arranged from a coolant introduction direction of a coolant inlet port to constitute a pair of battery module groups, a coolant introduction part extending from the coolant inlet port to each battery module group is provided at a middle of a pack case wherein the coolant introduction part is located between respective battery module groups, coolant discharge parts extending from respective battery module groups to coolant outlet ports are provided at an upper and lower part of the pack, and a coolant flow channel defined between the coolant introduction part and the coolant discharge parts is (Continued)

configured such that a coolant, introduced through the coolant introduction part, passes by each unit cell, and is discharged through the respective coolant discharge parts.

23 Claims, 6 Drawing Sheets

(51) Int. Cl.
| | |
|---|---|
| *H01M 10/625* | (2014.01) |
| *H01M 10/663* | (2014.01) |
| *H01M 10/6563* | (2014.01) |
| *H01M 10/647* | (2014.01) |
| *H01M 10/652* | (2014.01) |
| *H01M 10/6557* | (2014.01) |
| *H01M 10/6566* | (2014.01) |
| *H01M 10/613* | (2014.01) |
| *B60L 1/00* | (2006.01) |
| *B60L 1/02* | (2006.01) |
| *B60L 58/21* | (2019.01) |
| *B60L 58/26* | (2019.01) |
| *B60L 50/64* | (2019.01) |
| *H01M 2/10* | (2006.01) |

(52) U.S. Cl.
CPC .............. *B60L 58/21* (2019.02); *B60L 58/26* (2019.02); *H01M 10/613* (2015.04); *H01M 10/625* (2015.04); *H01M 10/647* (2015.04); *H01M 10/652* (2015.04); *H01M 10/6557* (2015.04); *H01M 10/6563* (2015.04); *H01M 10/6566* (2015.04); *H01M 10/663* (2015.04); *B60L 2240/545* (2013.01); *H01M 2/1077* (2013.01); *H01M 2220/20* (2013.01); *Y02T 10/7011* (2013.01); *Y02T 10/7061* (2013.01)

(58) Field of Classification Search
CPC ............ H01M 10/652; H01M 10/647; H01M 10/6563; H01M 10/663; H01M 10/625; H01M 2220/20; H01M 2/1077; B60L 3/0046; B60L 50/64; B60L 58/26; B60L 58/21; B60L 1/02; B60L 1/003; B60L 2240/545

See application file for complete search history.

(56) References Cited

U.S. PATENT DOCUMENTS

| | | |
|---|---|---|
| 2007/0026301 A1 | 2/2007 | Lee et al. |
| 2007/0031728 A1 | 2/2007 | Lee et al. |
| 2008/0026284 A1* | 1/2008 | Fujii ..................... H01M 2/105 429/120 |
| 2010/0285347 A1 | 11/2010 | Saito et al. |
| 2011/0177367 A1* | 7/2011 | Chung ................ H01M 2/1077 429/83 |
| 2012/0088131 A1 | 4/2012 | Chung et al. |
| 2012/0183822 A1 | 7/2012 | Chung et al. |

FOREIGN PATENT DOCUMENTS

| | | | |
|---|---|---|---|
| JP | 2006-128123 A | | 5/2006 |
| JP | 2007-42637 A | | 2/2007 |
| JP | 2008254627 A | * | 10/2008 |
| JP | 2010-262870 A | | 11/2010 |
| JP | 2011119102 A | * | 6/2011 |
| KR | 2001-0059123 A | | 7/2001 |
| KR | 10-2007-0014661 A | | 2/2007 |
| KR | 10-2007-0014662 A | | 2/2007 |
| KR | 10-2009-0002428 A | | 1/2009 |
| KR | 10-2011-0019490 A | | 2/2011 |
| WO | WO 2010/098598 A2 | | 9/2010 |
| WO | WO 2011/021843 A2 | | 2/2011 |

OTHER PUBLICATIONS

Translation of JP 2011-119102.*
International Search Report issued in PCT/KR2012/004413, dated Dec. 20, 2012.

* cited by examiner

[FIG. 1]
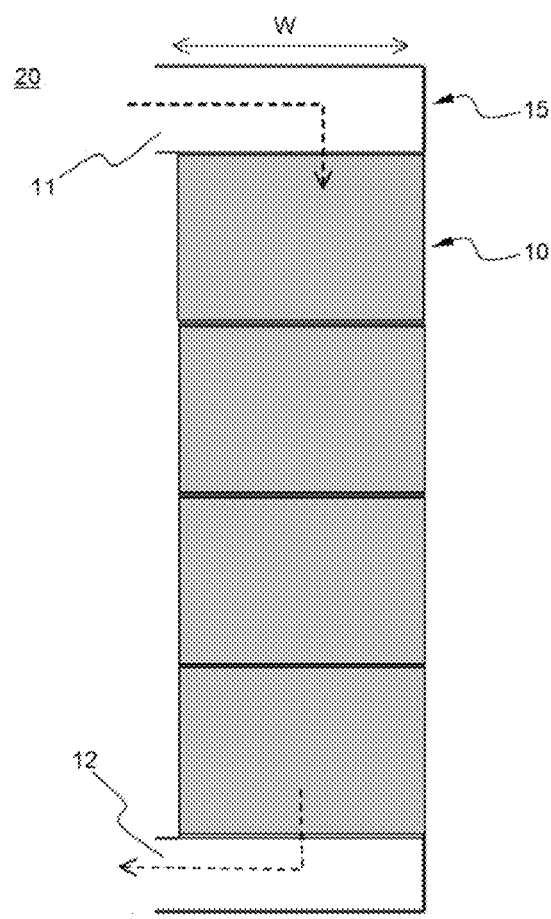

[FIG. 2]
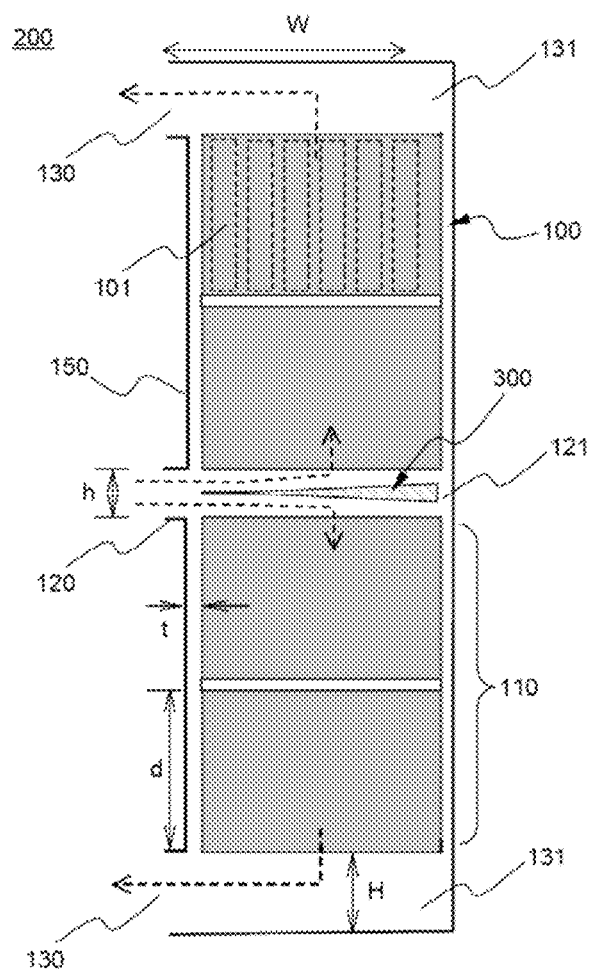

[FIG. 3]
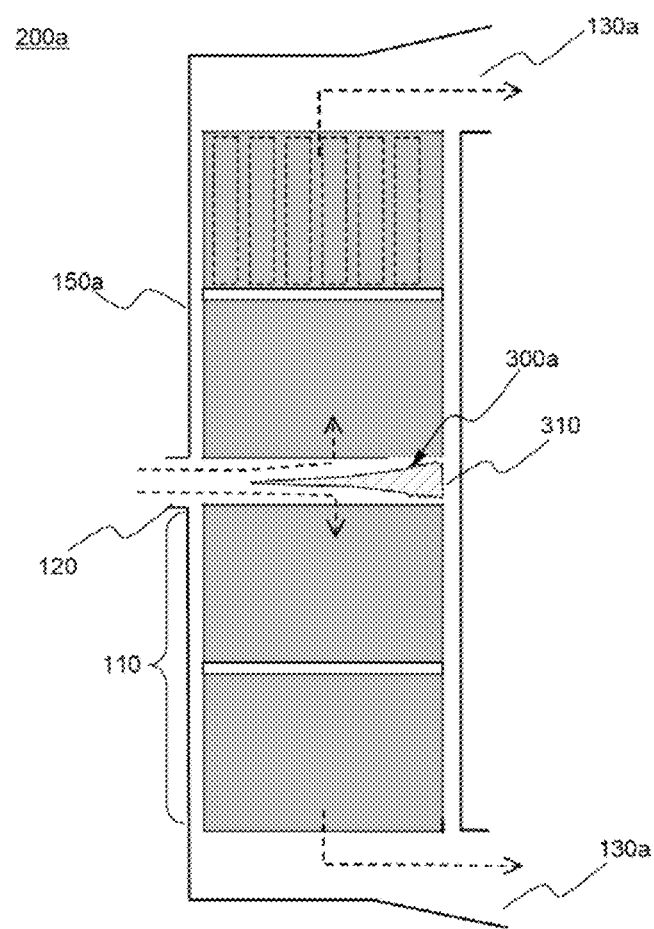

[FIG. 4]
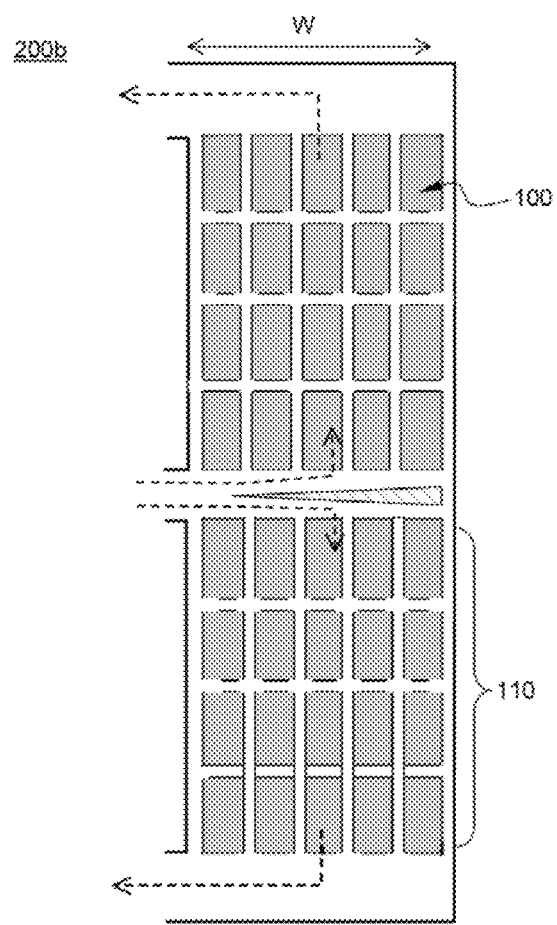

[FIG. 5]
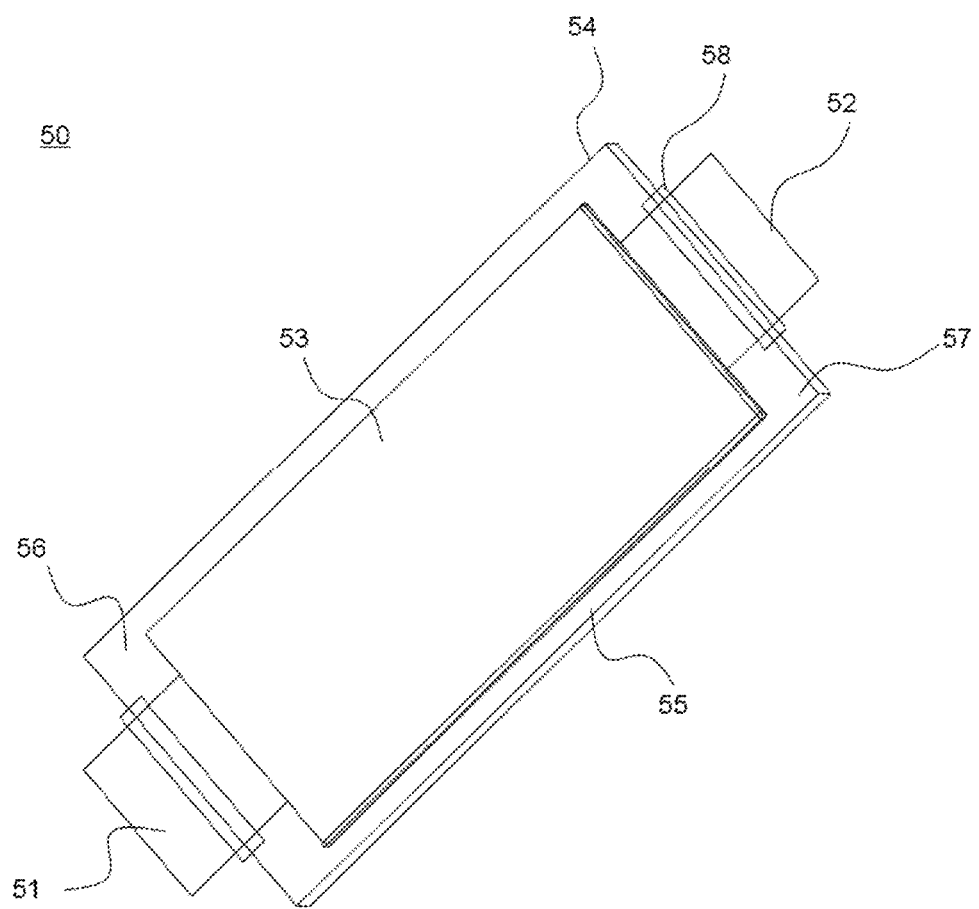

[FIG. 6]
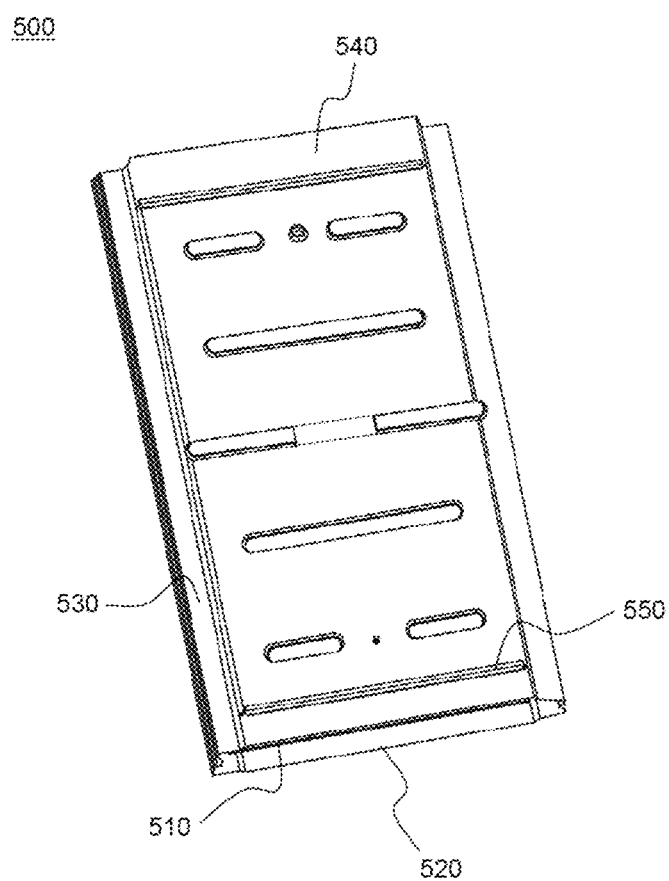

BATTERY PACK OF NOVEL AIR COOLING STRUCTURE

CROSS REFERENCE TO RELATED APPLICATIONS

This application is a Bypass Continuation of PCT International Application No. PCT/KR2012/004413 filed on Jun. 5, 2012, which claims priority under 35 U.S.C § 119(a) to Patent Application No. 10-2011-0059892 filed in the Republic of Korea on Jun. 21, 2011, all of which are hereby expressly incorporated by reference into the present application.

TECHNICAL FIELD

The present invention relates to a battery pack including battery cells or unit modules that can be charged and discharged, wherein the battery pack is configured to have a structure in which a plurality of the unit cells constitutes a battery module, two or more of the battery modules are vertically arranged in a height direction of the battery pack from a coolant introduction direction of a coolant inlet port to constitute a pair of battery module groups, a coolant introduction part extending from the coolant inlet port to each battery module group is provided at a middle of a pack case in a state in which the coolant introduction part is located between the respective battery module groups, coolant discharge parts extending from the respective battery module groups to coolant outlet ports are provided at an upper part and a lower part of the pack case, and a coolant flow channel defined between the coolant introduction part and the coolant discharge parts is configured to have a structure in which a coolant, introduced through the coolant introduction part, passes by each unit cell to cool each unit cell, and is discharged through the respective coolant discharge parts.

BACKGROUND ART

Recently, a secondary battery, which can be charged and discharged, has been widely used as an energy source for wireless mobile devices. In addition, the secondary battery has attracted considerable attention as a power source for electric vehicles (EV) and hybrid electric vehicles (HEV), which have been developed to solve problems, such as air pollution, caused by existing gasoline and diesel vehicles using fossil fuels.

Small-sized mobile devices use one or several battery cells per device. On the other hand, middle or large-sized devices, such as vehicles, use a middle or large-sized battery module having a plurality of battery cells electrically connected to one another because high power and large capacity are necessary for the middle or large-sized devices.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell of the middle or large-sized battery module. In particular, much interest is currently focused on the pouch-shaped battery, which uses an aluminum laminate sheet as a sheathing member, because the pouch-shaped battery is lightweight, the manufacturing costs of the pouch-shaped battery are low, and it is possible to easily modify the shape of the pouch-shaped battery.

In order for the middle or large-sized battery module to provide power and capacity required by a specific apparatus or device, it is necessary for the middle or large-sized battery module to be configured to have a structure in which a plurality of battery cells is electrically connected in series to each other or in series and parallel to each other and the battery cells are stable against external force.

Meanwhile, the battery cells constituting the middle or large-sized battery module may be secondary batteries which can be charged and discharged. Consequently, a large amount of heat is generated from such high-power, large-capacity secondary batteries during charge and discharge of the secondary batteries. If the heat, generated from the unit battery during charge and discharge of the unit battery, is not effectively removed from the unit battery, the heat accumulates in the unit battery with the result that deterioration of the unit battery is accelerated. According to circumstances, the unit battery may catch fire or explode. For this reason, a battery pack for vehicles, which is a high-power, large-capacity battery, needs a cooling system to cool battery cells mounted in the battery pack.

In a middle or large-sized battery pack including a plurality of battery cells, on the other hand, the deterioration in performance of some battery cells leads to the deterioration in performance of the entire battery pack. One of the main factors causing the non-uniformity in performance is the non-uniformity of cooling between the battery cells. For this reason, it is necessary to provide a structure to secure cooling uniformity during the flow of a coolant.

As shown in FIG. 1, a conventional middle or large-sized battery pack may be configured to have a structure in which unit cells are uprightly arranged in a width direction W of a battery pack 20 to constitute a battery module 10 layer and, for example, four battery module 10 layers are mounted in a pack case 15 in a state in which the battery module 10 layers are stacked in a height direction of the battery pack 20.

Consequently, a coolant, introduced from a coolant introduction part 11, which is formed at the upper part of the battery pack, sequentially passes through flow channels defined between the respective unit cells stacked in a vertical direction to cool the unit cells and is discharged from the battery pack through a coolant discharge part 12, which is formed at the lower part of the battery pack.

In the above structure, however, temperature deviation between the battery module layers is generated and the coolant flow channel is lengthened to generate differential pressure. As a result, it is difficult to achieve uniform cooling between the battery cells.

Consequently, there is a high necessity for technology to fundamentally solve the above problems.

DISCLOSURE

Technical Problem

Therefore, the present invention has been made to solve the above problems and other technical problems that have yet to be resolved.

It is an object of the present invention to provide a battery pack that is capable of minimizing temperature deviation between unit cells of battery module layers and differential pressure between the unit cells, thereby restraining performance of the unit cells from being lowered and improving cooling efficiency.

It is another object of the present invention to provide a battery pack configured to have a structure in which a coolant flow channel is easily changed according to the structure of a device to which the battery pack is applied, whereby flexibility in design is improved.

Technical Solution

In accordance with one aspect of the present invention, the above and other objects can be accomplished by the provision of a battery pack including battery cells or unit modules (unit cells) that can be charged and discharged, wherein the battery pack is configured to have a structure in which a plurality of the unit cells constitutes a battery module, two or more of the battery modules are vertically arranged in a height direction (vertical direction) of the battery pack from a coolant introduction direction of a coolant inlet port to constitute a pair of battery module groups, a flow space ('a coolant introduction part') extending from the coolant inlet port to each battery module group is provided at a middle of a pack case in a state in which the coolant introduction part is located between the respective battery module groups, flow spaces ('coolant discharge parts') extending from the respective battery module groups to coolant outlet ports are provided at an upper part and a lower part of the pack case, and a coolant flow channel defined between the coolant introduction part and the coolant discharge parts is configured to have a structure in which a coolant, introduced through the coolant introduction part, passes by each unit cell to cool each unit cell, and is discharged through the respective coolant discharge parts.

In the battery pack according to the present invention, therefore, the length of the coolant flow channel and flow speed of the coolant in the coolant flow channel are greatly reduced through the structure as described above. Consequently, it is possible to effectively remove heat generated from the unit cells and to greatly reduce temperature deviation between the unit cells of the respective battery module groups.

In a preferred example, each battery module group may further include one or more battery modules laterally arranged in a width direction of the battery pack in a state in which the battery modules are disposed adjacent to each other as needed.

Meanwhile, the battery pack may be configured to have a structure in which the top and the bottom of each battery module group are respectively spaced apart from the top and the bottom of the pack case by a predetermined width to define the coolant flow channel therebetween. In this case, the coolant, introduced from one side of the pack case, may uniformly the battery modules within a predetermined temperature deviation range while passing through the space.

In the above structure, the spacing width defined between the outside of each battery module group and the inside of the pack case may be set within a range in which it is possible to uniformly cool the battery modules within the predetermined temperature deviation range and, in addition, to appropriately adjust the overall size of the battery pack. For example, the spacing width may be equivalent to 0 to 100% the height of each battery module.

According to circumstances, a spacing width equivalent to 5 to 30% the height of each battery module may be defined between the outside of each battery module group and the inside of the pack case.

Meanwhile, the coolant introduction part may have a height equivalent to 20 to 90% the height of each coolant discharge part such that the coolant, introduced into the coolant introduction part, can reach up to the battery cell far from the coolant introduction part. Consequently, it is possible to exhibit a relatively uniform coolant distribution effect under a condition that flow rate of the coolant is uniform.

In a preferred example, the coolant discharge parts may be formed at the upper part and the lower part of the pack case and the coolant introduction part may be located between the battery module groups. In this case, it is possible to minimize the length of the coolant flow channel from the coolant introduction part to the coolant discharge parts, which is preferable. That is, the coolant flow channel may include a pair of U type coolant flow channels provided in the pack case.

According to circumstances, a driving fan to provide flow driving force to the coolant may be further mounted in the coolant inlet port and/or each coolant outlet port such that the coolant, introduced from the coolant introduction part, passes through the battery modules, rapidly and smoothly flows to the coolant outlet port, and is discharged from the battery pack through the coolant outlet port.

In another preferred example, the coolant inlet port may be connected to an air conditioner system of a vehicle such that cooled air, i.e. low-temperature air, is introduced into the coolant inlet port. Consequently, it is possible to more efficiently cool the unit cells using the low-temperature air than in an air cooling type cooling structure using room-temperature air.

In addition, the battery pack according to the present invention may be used in a structure in which cooling efficiency is particularly serious, i.e. a structure in which the height of the battery pack is twice or more, preferably two to six times, the width of the battery pack.

In the battery pack according to the present invention, the coolant introduction parts and the coolant discharge parts may be configured to have various structures. Some preferred example thereof will hereinafter be described.

As a first example, the coolant inlet port and the coolant outlet ports of the battery pack may be located at the same side or opposite sides of the pack case. In this structure, positions of the coolant inlet port and the coolant outlet ports may be easily changed according to the structure of a device to which the battery pack is applied, whereby flexibility in design is improved.

In addition, the battery pack may be configured to have a structure vertically symmetric with respect to the coolant introduction part to achieve uniform flow of the coolant. Consequently, it is possible to greatly reduce the length of the coolant flow channel as compared with the conventional coolant flow channel.

As a second example, the pack case may be configured to have a structure in which the top and/or the bottom of the pack case includes two or more continuous inclined surfaces to improve efficiency in discharge of the coolant.

As a third example, the battery module groups (an upper battery module group and a lower battery module group) may be respectively arranged at the upper side and the lower side of the coolant introduction part and the coolant flow channel may be divided in the coolant introduction part in a width direction of the battery pack such that the coolant is introduced into the upper battery module group and the lower battery module group.

Specifically, a division member, which is configured to have a structure in which a distance from each battery module group is decreased toward an end of the coolant introduction part opposite to the coolant inlet port, may be mounted in the coolant introduction part. In this case, the flow rate of the coolant is decreased although the flow speed of the coolant is gradually increased with the result that equal amounts of coolant are introduced into the respective battery module groups.

That is, the coolant introduction part is divided by the division member. In a case in which the vertical sectional width of the coolant introduction part is reduced, therefore, it is possible to reduce temperature deviation between the unit cells and thus further improving performance of the unit cells.

In addition, according to the present invention, the distance between the division member and the respective battery module groups may be adjusted in an inverse proportional relationship in response to a ratio of the height of the upper coolant discharge part formed at the upper part of the pack case to the height of the lower coolant discharge part formed at the lower part of the pack case.

In an example, in a case in which the height of the upper coolant discharge part formed at the upper part of the pack case is less than the height of the lower coolant discharge part formed at the lower part of the pack case, pressure applied to the upper coolant discharge part formed at the upper part of the pack case may be increased. For this reason, the position of the division member may be adjusted such that the distance between the division member and the upper battery module group is increased and thus a relatively larger amount of coolant introduction through the coolant introduction part flows to the upper battery module group.

Consequently, the coolant may uniformly flow to the upper battery module group and the lower battery module group by the division member, thereby improving cooling efficiency of the battery pack.

The division member may be configured to have a structure in which portions of the division member facing the respective battery module groups includes two or more continuous inclined surfaces. That is, inclined surfaces, the inclination of which is increased from one end of the coolant inlet port to the opposite end of the coolant inlet port, may be formed at the division member.

Consequently, the coolant, introduced through the coolant introduction part, reaches to the opposite end of the coolant introduction part while the flow speed of the coolant is gradually increased as the coolant flows along the continuous inclined surfaces. As a result, it is possible to uniformly cool all of the unit cells, i.e. the unit cells adjacent to the coolant introduction part and the unit cells far from the coolant introduction part.

In addition, the division member may be provided at surfaces thereof corresponding to the opposite end of the coolant inlet port with irregularities. That is, irregularities to generate eddy coolant may be formed at surfaces of the division member corresponding to the opposite end of the coolant inlet port with the result that it is possible to uniformalize the flow rate of the coolant flowing in the coolant flow channel defined between the unit cells. Consequently, it is possible to effectively remove heat generated during charge and discharge of the battery cells through uniform flow of the coolant. As a result, it is possible to enhance cooling efficiency and to improve operational performance of the unit cells.

Meanwhile, the battery modules may be continuously vertically arranged in a state in which coolant flow channels of the respective battery modules communicate with each other.

The number of the unit cells constituting each battery module may be changed depending upon a required driving output of a vehicle and a height limit of the vehicle. For example, each battery module may include 8 to 24 unit cells.

For reference, the term "battery module" used in the specification inclusively means the structure of a battery system configured to have a structure in which two or more chargeable and dischargeable battery cells or unit modules are mechanically coupled and, at the same time, electrically connected to each other to provide high power and large capacity. Therefore, the battery module itself may constitute a single apparatus or a part of a large-sized apparatus. For example, a large number of small-sized battery modules may be connected to each other to constitute a large-sized battery module. Alternatively, a small number of battery cells may be connected to each other to constitute a unit module, and a plurality of the unit modules may be connected to each other.

The unit cells may be spaced apart from each other by a size equivalent to 5 to 50% the thickness of each unit cell such that the coolant effectively cools the unit cells while passing between the unit cells.

For example, if the distance between the unit cells is less than 5% the thickness of each unit cell, it is difficult to achieve a desired coolant cooling effect, which is not preferable. On the other hand, if the distance between the unit cells is greater than 50% the thickness of each unit cell, the overall size of the battery module constituted by the plurality of unit cells is increased, which is not preferable.

Meanwhile, each unit module may be configured to have a structure in which plate-shaped battery cells, each of which has electrode terminals formed at the upper end and the lower end thereof, are connected in series to each other. For example, each unit module may include two or more battery cells, the electrode terminals of which are connected in series to each other, and a pair of high-strength cell covers coupled to cover outsides of the battery cells excluding the electrode terminals of the battery cells.

Each of the plate-shaped battery cells is a battery cell having a small thickness and a relatively large width and length so as to minimize the overall size of a battery module when the battery cells are stacked to constitute the battery module. In a preferred example, each of the battery cells may be a secondary battery configured to have a structure in which an electrode assembly is mounted in a battery case formed of a laminate sheet including a resin layer and a metal layer, and electrode terminals protrude from the upper and lower ends of the battery case. Specifically, the electrode assembly may be mounted in a pouch-shaped case formed of an aluminum laminate sheet. The secondary battery with the above-described structure may also be referred to as a pouch-shaped battery cell.

Each of the battery cells may be a secondary battery, such as a nickel metal hydride secondary battery or a lithium secondary battery. The lithium secondary battery is particularly preferable since the lithium secondary battery has high energy density and large discharge voltage.

Meanwhile, the coolant may be air. Of course, however, the coolant is not limited thereto.

The unit cells may be uprightly arranged in a width direction (horizontal direction) of the battery pack in a state in which the unit cells are spaced apart from each other such that the coolant flows between the unit cells to constitute a battery module.

In accordance with another aspect of the present invention, there is provided an electric vehicle, a hybrid electric vehicle, a plug-in hybrid electric vehicle, or a power storage device using the battery pack with the above-stated construction as a power source.

Particularly, in a case in which the battery pack is used in the electric vehicle, a hybrid electric vehicle, or a plug-in hybrid electric vehicle, as the power source, the battery pack may be mounted in a trunk of the vehicle.

The electric vehicle, the hybrid electric vehicle, the plug-in hybrid electric vehicle, and the power storage device using the battery pack as the power source are well known in the art to which the present invention pertains and thus a detailed description thereof will be omitted.

DESCRIPTION OF DRAWINGS

The above and other objects, features and other advantages of the present invention will be more clearly understood from the following detailed description taken in conjunction with the accompanying drawings, in which:

FIG. 1 is a plan typical view showing a conventional middle or large-sized battery pack;

FIGS. 2 to 4 are views showing embodiments of a battery pack according to the present invention;

FIG. 5 is a perspective view showing a pouch-shaped battery cell; and

FIG. 6 is a perspective view showing a cell cover, in which the battery cell of FIG. 5 will be mounted to constitute a unit module.

BEST MODE

Now, preferred embodiments of the present invention will be described in detail with reference to the accompanying drawings. It should be noted, however, that the scope of the present invention is not limited by the illustrated embodiments.

FIG. 2 is a plan view typically showing an exemplary battery pack according to the present invention.

Referring to FIG. 2, a battery pack 200 is configured to have a structure in which unit cells 101 are uprightly arranged in a width direction of the battery pack 200 in a state in which the unit cells 101 are spaced apart from each other such that a coolant flows between the unit cells 101 to constitute a battery module 100 and two battery modules 100 are vertically arranged in a height direction of the battery pack 200 from a coolant introduction direction of a coolant inlet port 120 to constitute a pair of battery module groups 110.

A coolant introduction part 121 extending from the coolant inlet port 120 to each battery module group 110 is provided at the middle of a pack case 150 in a state in which the coolant introduction part 121 is located between the respective battery module groups 110. Coolant discharge parts 131 extending from the respective battery module groups 110 to coolant outlet ports 130 are provided at the upper part and the lower part of the pack case. Consequently, a pair of U type coolant flow channels is defined in the pack case 150.

The coolant introduction part 121 has a height h equivalent to about 80% a height H of each coolant discharge part 131. According to circumstances, a spacing width W equivalent to about 40% a height d of each battery module is defined between the bottom of each battery module group and the bottom of the pack case and a spacing width t equivalent to about 10% the height d of each battery module is defined between the outside of each battery module group 110 and the inside of the pack case 150.

Of course, the spacing widths may be changed within a range of size equivalent to about 0 to 100% the height d of each battery module as needed.

Consequently, a coolant, introduced through the coolant introduction part 121, vertically passes through the respective battery module groups 110. At this time, some of the coolant passes through a space defined between the outside of each battery module group 110 and the inside of the pack case 150. Subsequently, the coolant is collected between the respective battery module groups 110 and is then discharged from the battery pack through the coolant outlet ports 130.

Furthermore, the coolant inlet port 200 may be connected to an air conditioner system (not shown) of a vehicle such that cooled air, i.e. low-temperature air, is introduced into the coolant inlet port 200, passes vertically through the battery module groups 110, and is discharged through the coolant outlet ports 130. Consequently, it is possible to greatly improve cooling efficiency of the battery modules 100 as compared with an air cooling type cooling system using room-temperature air.

Meanwhile, a division member 300, which is configured to have a structure in which the distance from each battery module group 110 is decreased toward an end of the coolant introduction part 121 opposite to the coolant inlet port 200, is mounted in the coolant introduction part 121.

In this case, the division member 300 is mounted above one of the battery module groups 110 such that two battery modules 100 of the other battery module group 110 are stacked above the division member 300. As a result, the division member 300 may support the battery cells mounted in the battery modules 100.

Consequently, the coolant flow channel is divided into two parts such that the coolant is introduced into the respective battery module groups. As a result, equal amounts of coolant are introduced into the respective battery module groups.

According to the present invention to which the division member 300 having the above structure is applied, the temperature deviation and differential pressure between the battery cells are reduced to about ¼ those of the conventional battery pack.

FIG. 3 is a plan view typically showing another exemplary battery pack according to the present invention.

Referring to FIG. 3 together with FIG. 2, a coolant inlet port 120 and coolant outlet ports 130a of a battery pack 200a are located at opposite sides of a pack case 150a. The top and the bottom of the pack case 150a include inclined surfaces.

In addition, a division member 300a is configured to have a structure in which portions of the division member 300a facing battery module groups 110 include two continuous inclined surfaces. Irregularities 310 to generate eddy coolant are formed at surfaces of the division member 300a corresponding to an end opposite to the coolant inlet port 120. The other configuration of the battery pack is identical to that of the battery pack described with reference to FIG. 2 and, therefore, a detailed description thereof will be omitted.

FIG. 4 is a plan view typically showing a further exemplary battery pack according to the present invention.

Referring to FIG. 4 together with FIG. 2, each battery module group 110 further includes four battery modules 100 laterally arranged in a width direction of a battery pack 200b in a state in which the battery modules 100 are disposed adjacent to one another. The other configuration of the battery pack is identical to that of the battery pack described with reference to FIG. 2 and, therefore, a detailed description thereof will be omitted.

FIG. 5 is a perspective view typically showing a pouch-shaped battery cell.

Referring to FIG. 5, a pouch-shaped battery cell 50 is configured to have a structure in which two electrode leads 51 and 52 protrude from the upper end and the lower end of a battery cell body 53, respectively, in a state in which the electrode leads 51 and 52 are opposite to each other. A sheathing member 54 includes upper and lower sheathing parts. That is, the sheathing member 54 is a two-unit member. In a state in which an electrode assembly (not shown) is mounted in a receiving part which is defined between the upper and lower sheathing parts of the sheathing member 54, opposite sides 55, upper ends 56, and lower ends 57, which are contact regions of the upper and lower sheathing parts of the sheathing member 54, are bonded to each other, whereby the battery cell 50 is manufactured.

The sheathing member 54 is configured to have a laminate structure of a resin layer/a metal film layer/a resin layer. Consequently, it is possible to bond the opposite sides 55, the upper ends 56, and the lower ends 57 of the upper and lower sheathing parts of the sheathing member 54, which are in contact with each other, to each other by applying heat and pressure to the opposite sides 55, the upper ends 56, and the lower ends 57 of the upper and lower sheathing parts of the sheathing member 54 so as to weld the resin layers thereof to each other. According to circumstances, the opposite sides 55, the upper ends 56, and the lower ends 57 of the upper and lower sheathing parts of the sheathing member 54 may be bonded to each other using a bonding agent. For the opposite sides 55 of the sheathing member 54, the same resin layers of the upper and lower sheathing parts of the sheathing member 54 are in direct contact with each other, whereby uniform sealing at the opposite sides 55 of the sheathing member 54 is accomplished by welding. For the upper ends 56 and the lower ends 57 of the sheathing member 54, on the other hand, the electrode leads 51 and 52 protrude from the upper ends 56 and the lower ends 57 of the sheathing member 54, respectively. For this reason, the upper ends 56 and the lower ends 57 of the upper and lower sheathing parts of the sheathing member 54 are thermally welded to each other, in a state in which a film type sealing member 58 is interposed between the electrode terminals 51 and 52 and the sheathing member 54, in consideration of the thickness of the electrode leads 51 and 52 and the difference in material between the electrode leads 51 and 52 and the sheathing member 54, so as to increase sealability of the sheathing member 54.

FIG. 6 is a perspective view showing a cell cover, in which two battery cells, one of which is shown in FIG. 5, will be mounted to constitute a unit module.

Referring to FIG. 6, a cell cover 500 has two pouch-shaped battery cells (not shown), one of which is shown in FIG. 5, mounted therein. The cell cover 500 serves not only to increase mechanical strength of the battery cells but also to enable the battery cells to be easily mounted to a module case (not shown). The two battery cells are mounted in the cell cover 500 in a state in which one-side electrode terminals of the battery cells are connected in series to each other and bent in tight contact.

The cell cover 500 includes a pair of members 510 and 520 which are configured to be coupled to each other. The cell cover 500 is made of a high-strength metal sheet. Steps 530 to enable the module to be easily fixed are formed at left and right side edges of the cell cover 500 and steps 540 having the same function are formed at the upper end and the lower end of the cell cover 500. In addition, fixing parts 550 are formed at the upper end and the lower end of the cell cover 500 such that the fixing parts 550 extend in the width direction of the cell cover 500. Consequently, the cell cover 500 is easily mounted to the module case (not shown).

As can be seen from the above embodiments, a battery pack may be configured to have a structure in which a coolant inlet port and coolant outlet ports are formed so as to correspond to the structure of a device to which the battery pack is applied. In addition, the battery pack includes a coolant introduction part provided at the middle of a pack case in a state in which the coolant introduction part is located between battery module groups, coolant discharge parts provided at the upper part and the lower part of the pack case, and a division member mounted in the coolant introduction part. Consequently, it is possible to effectively remove heat generated from unit cells and greatly reduce temperature deviation between the unit cells.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery pack according to the present invention includes a coolant introduction part provided at the middle of a pack case, coolant discharge parts provided at the upper part and the lower part of the pack case, and, preferably, a division member mounted in the coolant introduction part. Consequently, it is possible to uniformly supply a coolant to each unit cell and to minimize a temperature difference and differential pressure between the unit cells during such a cooling process.

In addition, the battery pack according to the present invention is configured to have a structure in which a coolant flow channel is easily changed according to the structure of a device to which the battery pack is applied, whereby flexibility in design is improved.

The invention claimed is:

1. A battery pack comprising battery cells or unit cells that can be charged and discharged, wherein the battery pack is configured to have a structure in which
   a plurality of the battery cells or unit cells constitutes a battery module,
   two or more of the battery modules are vertically arranged in a vertical direction of the battery pack from a coolant introduction direction of a coolant inlet port to constitute a pair of battery module groups,
   a coolant introduction part extending from the coolant inlet port to each battery module group is provided at a middle of a pack case in a state in which the coolant introduction part is located between the respective battery module groups,
   coolant discharge parts extending from the respective battery module groups to coolant outlet ports are provided at an upper part and a lower part of the pack case, and
   a coolant flow channel defined between the coolant introduction part and the coolant discharge parts is configured to have a structure in which a coolant, introduced through the coolant introduction part, passes by each unit cell to cool each unit cell, and is discharged through the respective coolant discharge parts,
   wherein the battery module groups include an upper battery module group and a lower battery module group which are respectively arranged at an upper side and a lower side of the coolant introduction part and the coolant flow channel is divided in the coolant introduction part in a width direction of the battery pack such that the coolant is introduced into the upper battery module group and the lower battery module group, wherein a division member, which is configured to have a structure in which a distance from each battery module group is decreased toward an end of the coolant introduction part opposite to the coolant inlet port, is mounted in the coolant introduction part, wherein an upper height between an upper surface of the upper battery module group and an upper surface of the coolant discharge part at the upper part of the pack case is different from a lower height between a lower surface of the lower battery module group and a lower surface of the coolant discharge part at the lower part of the pack case, wherein, when the upper height is less than the lower height, a position of the division member is adjusted such that the distance between an upper surface of the division member and a lower surface of the upper battery module group at a first distance from the coolant inlet port is greater than the distance between a lower surface of the division member and an upper surface of the lower battery module group at the first distance, wherein, when the upper height is greater than the lower height, a position of the division member is adjusted such that the distance between the upper surface of the division member at the first distance and the lower surface of the upper battery module group is less than the distance between the lower surface of the division member and the upper surface of the lower battery module group at the first distance, and wherein the division member is provided at surfaces thereof corresponding to an end opposite to the coolant inlet port with irregularities.

2. The battery pack according to claim 1, wherein each battery module group further comprises one or more battery modules laterally arranged in a width direction of the battery pack in a state in which the battery modules are disposed adjacent to each other.

3. The battery pack according to claim 1, wherein a top and a bottom of each battery module group are respectively spaced apart from a top and a bottom of the pack case by a predetermined width to define the coolant flow channel therebetween.

4. The battery pack according to claim 3, wherein the spacing width is equivalent to 5 to 50% a height of each battery module.

5. The battery pack according to claim 1, wherein the coolant introduction part has a height equivalent to 20 to 90% a height of each coolant discharge part.

6. The battery pack according to claim 1, wherein the coolant flow channel comprises a pair of U type coolant flow channels provided in the pack case.

7. The battery pack according to claim 1, wherein a driving fan to provide flow driving force to the coolant is further mounted in the coolant inlet port and/or each coolant outlet port.

8. The battery pack according to claim 1, wherein the coolant inlet port is connected to an air conditioner system of a vehicle such that cooled air is introduced into the coolant inlet port.

9. The battery pack according to claim 1, wherein the battery pack is configured to have a structure in which a height of the battery pack is twice or more than a width of the battery pack.

10. The battery pack according to claim 1, wherein the coolant inlet port and the coolant outlet ports are located at the same side or opposite sides of the pack case.

11. The battery pack according to claim 1, wherein the battery pack is configured to have a structure vertically symmetric with respect to the coolant introduction part.

12. The battery pack according to claim 1, wherein the pack case is configured to have a structure in which a top and/or a bottom of the pack case comprises two or more continuous inclined surfaces.

13. The battery pack according to claim 1, wherein the division member is configured to have a structure in which portions of the division member facing the respective battery module groups comprises two or more continuous inclined surfaces.

14. The battery pack according to claim 1, wherein the battery modules are continuously vertically arranged in a state in which coolant flow channels of the respective battery modules communicate with each other.

15. The battery pack according to claim 1, wherein each battery module comprises 8 to 24 unit cells.

16. The battery pack according to claim 1, wherein the unit cells are spaced apart from each other by a size equivalent to 5 to 50% a thickness of each unit cell.

17. The battery pack according to claim 1, wherein each unit cell comprises two or more battery cells, electrode terminals of which are connected in series to each other, and a pair of cell covers coupled to cover outsides of the battery cells excluding the electrode terminals of the battery cells.

18. The battery pack according to claim 1, wherein each battery cell is configured to have a structure in which an electrode assembly is mounted in a pouch-shaped case comprising a resin layer and a metal layer.

19. The battery pack according to claim 1, wherein each battery cell is a lithium secondary battery.

20. The battery pack according to claim 1, wherein the coolant is air.

21. The battery pack according to claim 1, wherein the unit cells are uprightly arranged in a horizontal direction of the battery pack in a state in which the unit cells are spaced apart from each other such that the coolant flows between the unit cells to constitute a battery module.

22. An electric vehicle, a hybrid electric vehicle, a plug-in hybrid electric vehicle, or a power storage device using a battery pack according to claim 1.

23. The battery pack according to claim 1, wherein the vertical direction is perpendicular to the coolant introduction direction of the coolant inlet port.

* * * * *